(No Model.)
G. ALLEN.
CONVERTING MOTION IN OIL PUMPING APPARATUS.
No. 326,008. Patented Sept. 8, 1885.
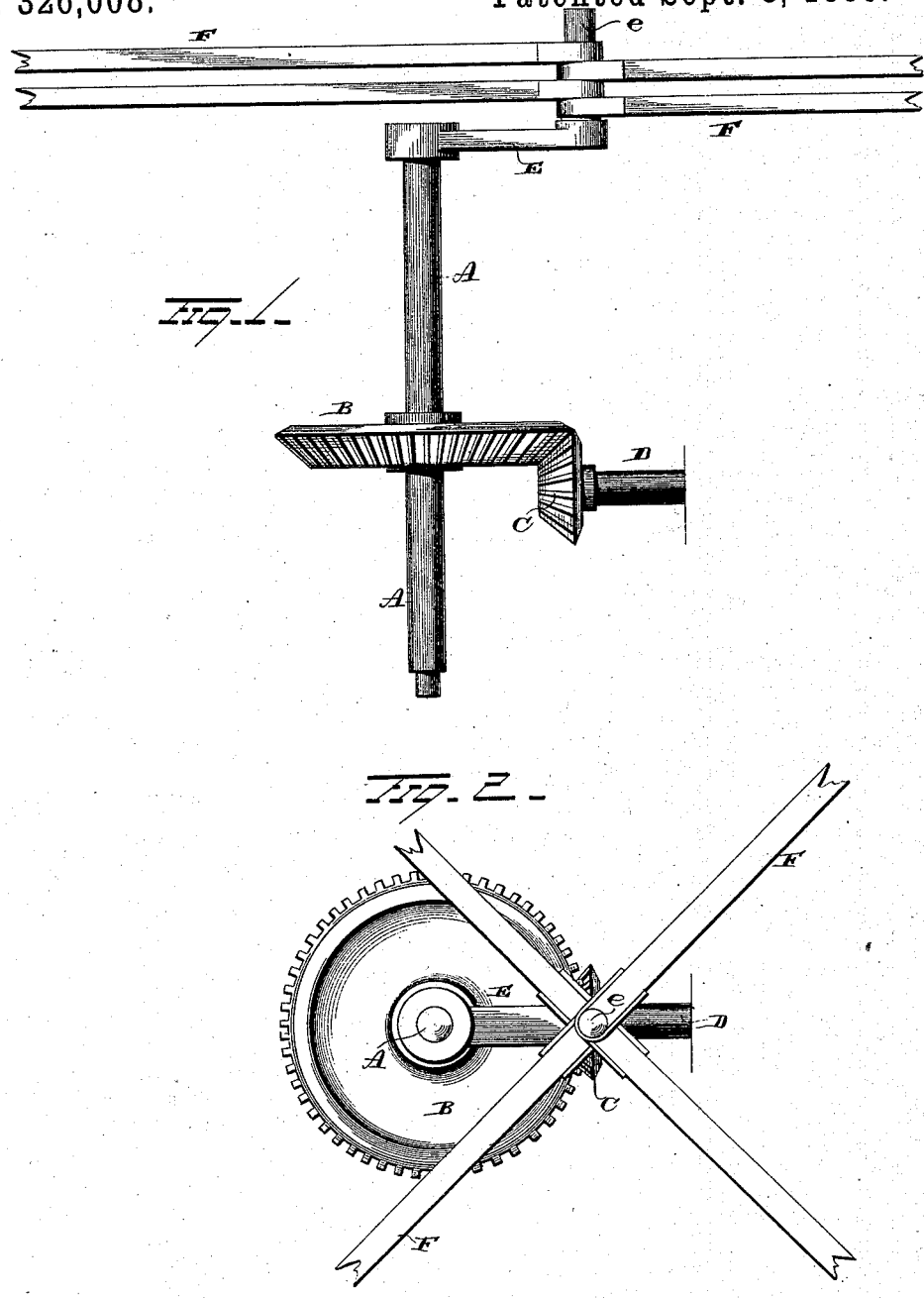

UNITED STATES PATENT OFFICE.

GEORGE ALLEN, OF FRANKLIN, PENNSYLVANIA.

CONVERTING MOTION IN OIL-PUMPING APPARATUS.

SPECIFICATION forming part of Letters Patent No. 326,008, dated September 8, 1885.

Application filed July 3, 1885. (No model.)

*To all whom it may concern:*

Be it known that I, GEORGE ALLEN, of Franklin, in the county of Venango and State of Pennsylvania, have invented certain new and useful Improvements in Devices for Converting Motion in Oil-Pumping Apparatus; and I do hereby declare the following to be a full, clear, and exact description of the invention, such as will enable others skilled in the art to which it appertains to make and use the same.

My invention relates to an improvement in devices for converting motion.

In Letters Patent No. 313,907, granted to me on March 17, 1885, a device was shown and described, consisting of an upright shaft driven by means of bevel-gear, and provided with a crank on its upper end, and a disk loosely mounted on the wrist-pin of the crank, the said disk being adapted to the attachment of pump-actuating rods leading in any desired direction therefrom. While the arrangement there described is eminently practicable and suited to a great majority of the larger systems of pumping, there is sometimes a demand for a cheaper construction, adapted to a more unpretentious system, and yet calculated to perform the work well.

The object of my present invention is to so modify my former construction, above referred to, as to make it more simple and inexpensive.

With these ends in view my invention consists in certain features of construction and combinations of parts, as will be hereinafter described, and pointed out in the claims.

In the accompanying drawings, Figure 1 is a view of the device in elevation, and Fig. 2 is a plan view.

A represents an upright shaft journaled in a suitable supporting-frame, and provided with a bevel gear-wheel, B, secured rigidly thereon, with which a pinion, C, on the engine or main drive-shaft D meshes. The upper end of the shaft A is provided with a crank, E, having an upwardly-extending wrist-pin, *e*.

For the purpose for which this device is designed it is essential that the shaft should not extend to any great extent above the upper side of the crank.

The ends of pump-actuating rods F are pivotally secured on the wrist-pin *e*, one above another, as shown, and leading in any desired directions therefrom. It is evident that as the shaft A is rotated the wrist-pin *e* will describe the circumference of a circle in a horizontal plane, and will, during each of its rotations, reciprocate each one of the pump-actuating rods F.

The crank E may be secured on the lower end of the shaft A, or the shaft may be bent in the form of a double crank between its bearings and the pump-actuating rods attached at that point.

Having fully described my invention, what I claim as new, and desire to secure by Letters Patent, is—

1. The combination, with an upright shaft and means for revolving it, of a crank secured thereto, and pump actuating rods pivotally secured on the wrist-pin of the crank and leading in different directions therefrom, substantially as set forth.

2. The combination, with an upright shaft and means for revolving it, of a crank secured to the upper end of the shaft, and pump-actuating rods pivotally secured on the wrist-pin of the crank and leading in any desired direction therefrom, for the purpose substantially as set forth.

3. The combination, with the upright shaft provided with the bevel-gear, and a main driving-shaft provided with a bevel-gear pinion adapted to engage said gear on the upright shaft, of a crank secured to the upper end of the upright shaft, and pump-actuating rods loosely secured on the wrist-pin of the crank and leading in different directions therefrom, substantially as set forth.

In testimony whereof I have signed this specification in the presence of two subscribing witnesses.

GEORGE ALLEN.

Witnesses:
E. H. LAMBERTON,
E. D. ALLEN.